(12) United States Patent
Kari et al.

(10) Patent No.: US 7,003,407 B1
(45) Date of Patent: Feb. 21, 2006

(54) CIRCUIT FOR DETECTING AND FORMATTING DATA FRAMES

(75) Inventors: Ahmed Kari, Aix en Provence (FR); Christophe Moreaux, Eguilles (FR)

(73) Assignee: STMicroelectronics S.A., Montrouge (FR)

(*) Notice: Subject to any disclaimer, the term of this patent is extended or adjusted under 35 U.S.C. 154(b) by 53 days.

(21) Appl. No.: 10/399,817

(22) PCT Filed: Oct. 23, 2000

(86) PCT No.: PCT/FR00/02946

§ 371 (c)(1),
(2), (4) Date: Apr. 23, 2003

(87) PCT Pub. No.: WO02/35466

PCT Pub. Date: May 2, 2002

(51) Int. Cl.
*G06F 3/00* (2006.01)

(52) U.S. Cl. .................. 702/57; 710/30; 370/506

(58) Field of Classification Search ............ 702/57–58, 702/117, 176–177, 182–183; 710/30, 300–301; 370/503–506, 509, 512; 714/724, 726, 727, 714/731, 738, 744
See application file for complete search history.

(56) References Cited

U.S. PATENT DOCUMENTS

| | | | | |
|---|---|---|---|---|
| 4,896,133 A | * | 1/1990 | Methvin et al. .......... 340/146.2 |
| 6,003,151 A | * | 12/1999 | Chuang ....................... 714/752 |
| 6,091,530 A | * | 7/2000 | Duckworth .................. 398/129 |
| 6,189,087 B1 | * | 2/2001 | Witt et al. ................... 712/208 |
| 6,222,757 B1 | * | 4/2001 | Rau et al. .................... 365/154 |
| 6,667,993 B1 | * | 12/2003 | Lippett et al. .............. 370/509 |
| 6,711,181 B1 | * | 3/2004 | Xue et al. .................... 370/504 |
| 6,735,198 B1 | * | 5/2004 | Edsall et al. ................ 370/389 |
| 6,738,392 B1 | * | 5/2004 | Thurston ..................... 370/503 |

FOREIGN PATENT DOCUMENTS

| FR | 2 772 534 A | 6/1999 |
|---|---|---|
| WO | WO9921129 A | 4/1999 |

OTHER PUBLICATIONS

French Preliminary Examination Report dated Jul. 19, 2001 for PCT/FR00/02946.

* cited by examiner

*Primary Examiner*—Marc S. Hoff
*Assistant Examiner*—Mary Catherine Baran
(74) *Attorney, Agent, or Firm*—Lisa K. Jorgenson; Jon A. Gibbons; Fleit, Kain, Gibbons, Gutman, Bongini & Bianco P.L.

(57) ABSTRACT

The invention concerns non-contact smart cards and, more particularly in such cards, a circuit for detecting data frames and providing them with a parallel format for their processing. The invention is characterised in that it consists in using the information contained in the first octets of the frame being currently received, thereby enabling to identify them as they are received and route them into registers (80). This is provided by a state machine (60) whereof the shift from one state to the other is switched by the circuitry (62, 76) output signals.

15 Claims, 4 Drawing Sheets

CIRCUIT FOR DETECTING AND FORMATTING DATA FRAMES

CROSS-REFERENCE TO RELATED APPLICATIONS

This application is the National Stage of International Application No. PCT/FR00/02946 filed on Oct. 23, 2000, which is based upon and claims priority therefrom, the entire disclosure of which is herein incorporated by reference.

BACKGROUND OF THE INVENTION

1. Field of the Invention

The invention relates to contact free integrated circuit cards, also called contact free smart cards, and more particularly the circuits in such cards that analyse binary signals received by the card to detect data frames and to update them in parallel form for their processing.

2. Description of Related Art

A contact free smart card comprises (FIG. 1):
an antenna 10 that detects radio frequency signals at the carrier frequency Fo sent by a transmitter from a remote reader and that transmits signals to the reader,
a radio frequency interface 12,
a logic block 14, and
a memory 16.

On reception, the radio frequency interface 12 receives signals detected by the antenna 10 and outputs firstly a regulated voltage Vdd that supplies power to the different electronic circuits, and secondly data signals and clock signals that are applied to the logic block 14.

On reception, the logic block 14 analyses the serial binary signals to present them in parallel form in the registers so as to interpret them in the form of operations such as read, write or erase data to be carried out in the memory 16.

The address in the memory 16 is given by the contents of one or several of the registers mentioned above, and the same is applicable for the data to be written in the memory 16.

In response to a command, the logic block 14 may carry out a read data operation in the memory 16 and may carry out processing on this data.

The data read in the memory, possibly after being processed by the logic block 14, is transmitted to the radio frequency interface 12 that outputs modulation signals applied to antenna 10 for transmission to the remote reader.

The binary signals that are sent by the remote reader, and which therefore have to be analysed by the logic block 14, are in the form of frames of binary digits "1" or "0" with formats defined by standards.

Thus, FIG. 2-*a* is an example of a frame format according to standard ISO14443-3, whereas FIG. 2*b* is an example of a frame format according to standard ISO15693-3.

Thus, the frame according to standard ISO14443-3 begins (references 20 and SOF) by a start of frame with ten to eleven "0" followed by two "1" binary digits and terminates (references 22 and EOF) by an end of frame with ten to eleven "0" followed by a "1".

For example, the start SOF is followed by a byte 24 indicating the read command, then n bytes (reference 26) corresponding to the address in memory 16, and two error check bytes (reference 28) more frequently known under the abbreviation CRC (Cyclic Redundancy Check).

Similarly, the frame according to ISO standard 15693-3 begins with a start of frame SOF 30, and finishes with an end of frame EOF, 32. For example, the start of frame SOF is followed by a Request byte 34, then a Command byte 36, then n data bytes 40 and two CRC bytes 38.

To detect a frame, the logic block 14 must analyse the sequence of binary signals output by the radio frequency interface to detect a start of frame SOF. When this start of frame is detected, the binary digits of the following bytes are detected as they arrive and are saved in registers, each register corresponding to one byte.

After an error check using two CRC bytes, the contents of the registers is validated which corresponds to validating the received frame. The planned operation (save, read or erase) may then be determined by decoding the contents of one of the registers, and then be executed.

This method of analysing binary signals to detect a frame and to present it in parallel form, and to validate it and decode it, leads to a relatively long frame processing time while the time available to carry out all the processing is limited by the time for a contact free smart card to pass in front of the reader.

Therefore, one purpose of this invention is to make a data frame detection circuit and to format the data frames for which the processing time is very short.

SUMMARY OF THE INVENTION

The invention relates to a data frame detection and formatting circuit in a contact free smart card characterized in that it comprises:
a state machine,
means of detecting binary digits or bits of a frame and arranging them in the form of bytes,
registers for saving each of the bits of a received byte, and
a circuit for decoding the number of bytes to be received during the frame.

The invention also relates to a process for detection and formatting of data frames for signals received by a contact free smart card, characterised in that it comprises the following steps consisting of:
(a) detecting start of frame SOF and end of frame EOF signals,
(b) detecting STARTBIT start signals and STOPBIT end of byte signals,
(c) counting bits received after each start of byte until a byte is obtained,
(d) counting bytes received to switch the bits in a byte to one of the registers,
(e) analysing at least the first byte received to determine the number of bytes in the frame currently being received, and
(f) loading a countdown with the number of bytes in the frame and decrementing it as bytes are received until the digit "0" is obtained which means that all bytes in the frame have been received.

BRIEF DESCRIPTION OF THE DRAWINGS

Other characteristics and advantages of this invention will become clear after reading the following description of a particular embodiment, the said description being made with relation to the attached drawings, wherein.

DETAILED DESCRIPTION OF PREFERRED EMBODIMENTS

Figure 1:
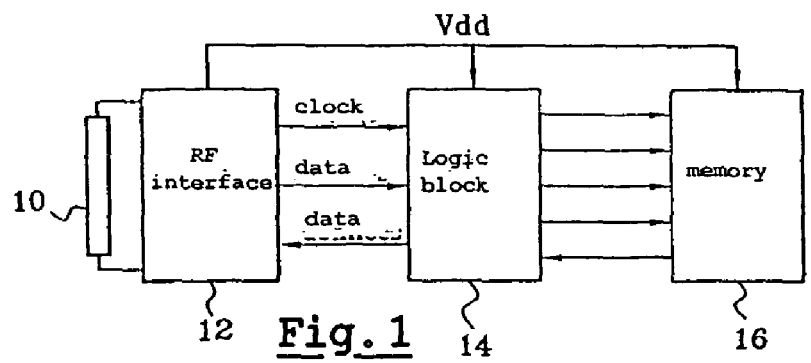
FIG. 1 is a simplified functional diagram of a contact free smart card.
Figure 2A:
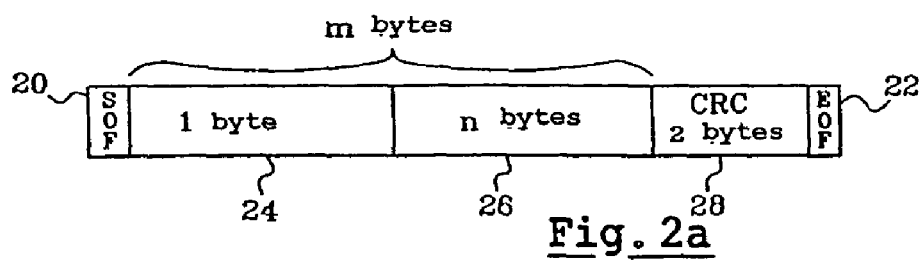
FIGS. 2*a* and 2*b* show the formats of frames defined by two ISO standards.
Figure 2B:
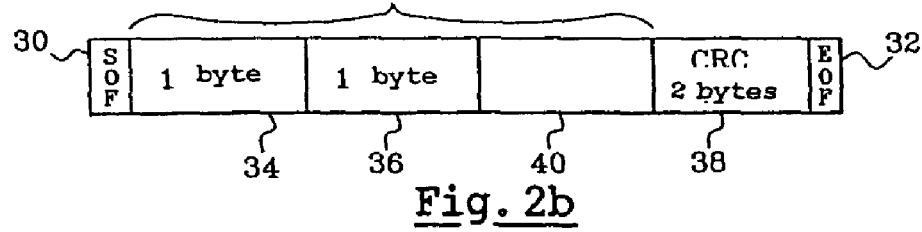

FIGS. 1 and 2a, 2b will not be described again, but they do form an integral part of the description of the invention.

The invention will be described in the case in which ISO standard 14443-3 is used corresponding to the format in FIG. 2a, but it could be used according to any other standard.

Figure 3:
FIG. 3 shows a frame with a single byte.

If the frame only comprises one byte, the format is as shown in FIG. 3, and comprises a start of frame SOF and an end of frame EOF.

The single byte 50 is preceded by a start bit STBit and is followed by an end bit STOPBIT.

The circuit according to the invention is based on knowledge of the number of bytes in the frame currently being analysed, which is given at the beginning of the frame by the operation to be done, in other words by the first bytes in the frame, for example the first one, two or three bytes.

Figure 5:
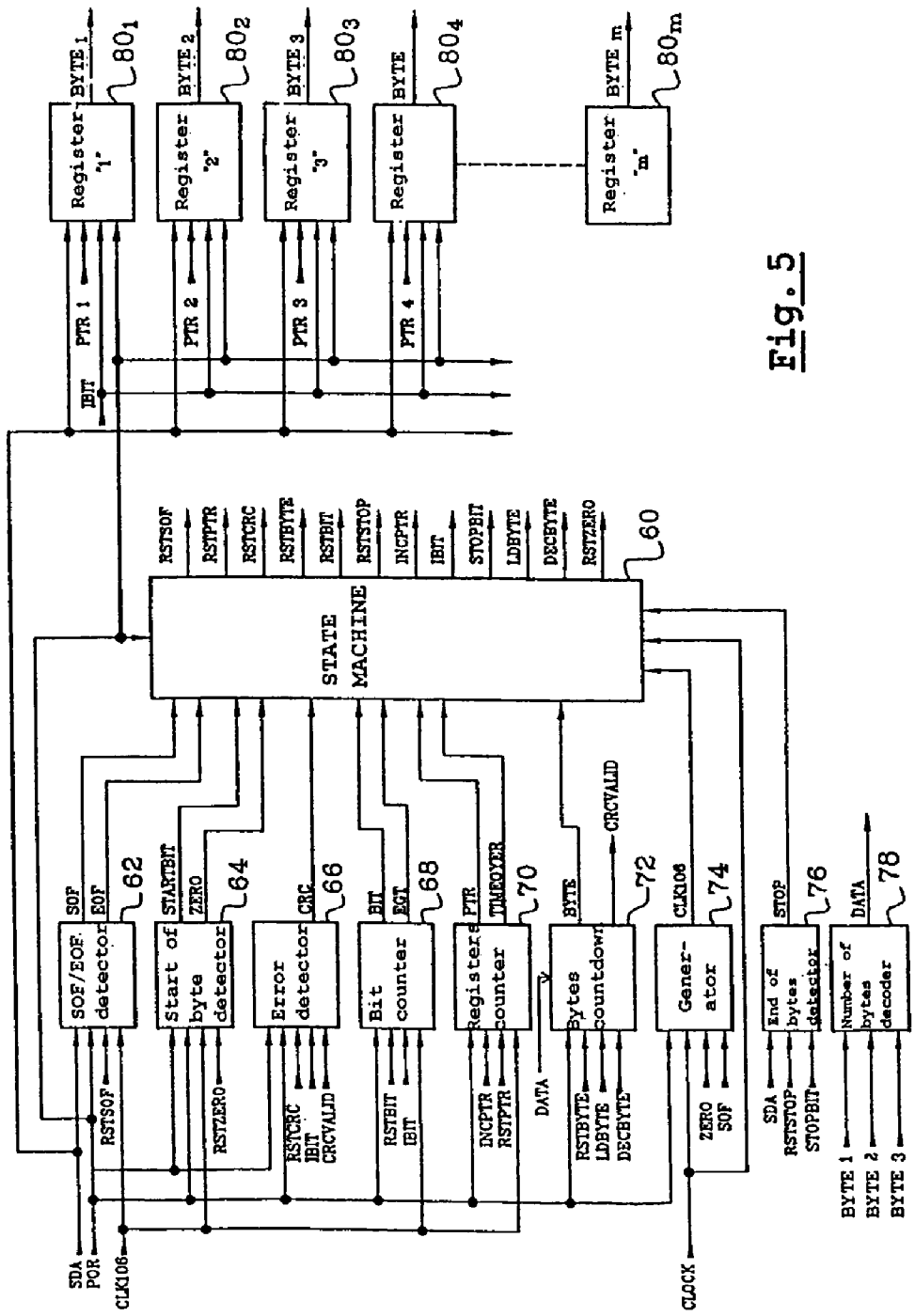
FIG. 5 is a diagram of the data frame detection and formatting circuit according to the invention.

The data frame detection and formatting circuit according to the invention comprises (FIG. 5):
a state machine 60,
circuits 62 to 76 that supply control signals for the state machine 60,
registers $80_1$ to $80_m$, each of which saves a byte in the frame as they are detected, except for the two CRC bytes, and
a decoding circuit 78 to decode the number (m+2) of bytes to be received, in other words including the two CRC bytes.

The circuit 62, called the "SOF/EOF detector", is a start of frame SOF and end of frame EOF detection circuit.

Figure 4A:
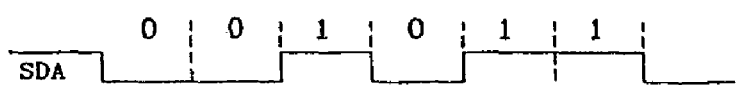
FIGS. 4*a*, 4*b*, 4*c* and 4*d* are diagrams for signals showing data synchronization.
Figure 4B:
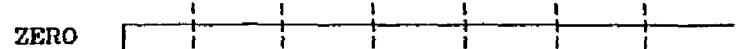
Figure 4C:
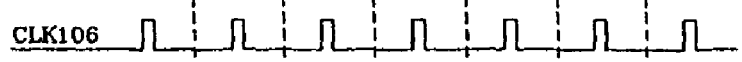
Figure 4D:

It receives the following signals on its input terminals:
SDA serial binary signals (FIG. 4a),
a POR signal, that is a power on reset signal,
an RSTSOF signal, that resets circuit 62 to the start of frame detection state, and
a CLK106 signal that is a clock signal (FIG. 4c), for example at a frequency of 106 kHz, which is the frequency of binary data signals, the carrier frequency F0 being 13.56 MHz, such that the ratio between the two frequencies is 128.

The detection circuit 62 outputs the start of frame SOF signal and the end of frame EOF signal that are each applied to an input terminal of the state machine 60.

The circuit 64, called the "start of byte detector" is a circuit that detects the start of a byte and the first binary digit "0" of the byte. It receives the SDA, POR, CLK106 signals and an RSTZERO signal (which is the reset signal output by the state machine) on its four input terminals. It outputs the STARTBIT start of byte signal and a "ZERO" signal (FIG. 4b) on its two output terminals. When the first data corresponds to a logical level "0", the ZERO signal and the STARTBIT signal change to logical level "1" after a time of 1.2 microseconds corresponding to the period for a second clock signal CK at a frequency of 847 kHz, namely a frequency which is about 8 times higher than the frequency of the first clock signal CLK106.

The circuit 66 called the "Error detector" is an error detection circuit that receives the SDA and POR signals, and the RSTCRC, IBIT and CRCVALID signals output by the state machine 60, on its five input terminals. It outputs a CRC signal on its output terminal which is applied to an input terminal of the state machine 60.

The circuit 68 called the "Bit counter" is a circuit that counts the bits in each byte and receives the POR, CLK106 and IBIT signals and an RSTBIT reset signal output by the state machine 60, on its four input terminals. It outputs a BIT signal and an EGT signal on its two output terminals, each of which is applied to an input terminal of the state machine 60.

The circuit 70, called the "Registers counter" is a circuit that counts the registers $80_1$ to $80_m$ to switch the bits in the bytes to the appropriate register. It receives the POR and CLK106 signals and an RSTPTR counter reset signal and a counter increment signal INCPTR, on its four input terminals. It outputs a PTR signal and a TIMEOVER signal on its two output terminals, that are applied to two input terminals of the state machine 60.

The circuit 72, called the "Byte countdown", is a circuit that counts down from a value DATA recorded in parallel. Its four input terminals receive the POR signal and three other signals:
an RSTBYTE reset countdown signal,
an LDBYTE load DATA value signal, and
a DECBYTE countdown signal.

It outputs a BYTE signal on a first output terminal that is applied to an input terminal of the state machine 60, and a CRCVALID signal on its second output terminal that indicates that the bytes being received are CRC bytes.

The circuit 74, called the "Pulse generator", outputs the 106 kHz clock signal CLK106 on its output terminal starting from the 847 kHz CK clock signal applied to one of its three input terminals. The three other input terminals receive the POR signal, the ZERO signal (FIG. 4b) and the SOF signal.

The circuit 76 is called the "End of byte detector" and its three input terminals receive the SDA signal, and the STOPBIT and RSTSTOP signals output by state machine 60, and it outputs a STOP signal applied to an input terminal of the state machine 60.

The circuit 78, called the "Number of bytes decoder", is a circuit that decodes the number of bytes contained in the frame. It converts the first byte or the first two bytes or the first three bytes in frame BYTE-1, BYTE-2, BYTE-3 into a number of DATA bytes (m+2) contained in the frame, the value DATA being recorded in the byte countdown 72.

The m registers 80, to 80*m* are designed so that each will record one byte in the frame, except for the two CRC bytes which are not recorded, and each comprises four input terminals and one output terminal byte BYTE-1 to BYTE-m. The signals SDA, POR, IBIT and PTR-1 to PTR-m are applied to the input terminals.

Figure 6:
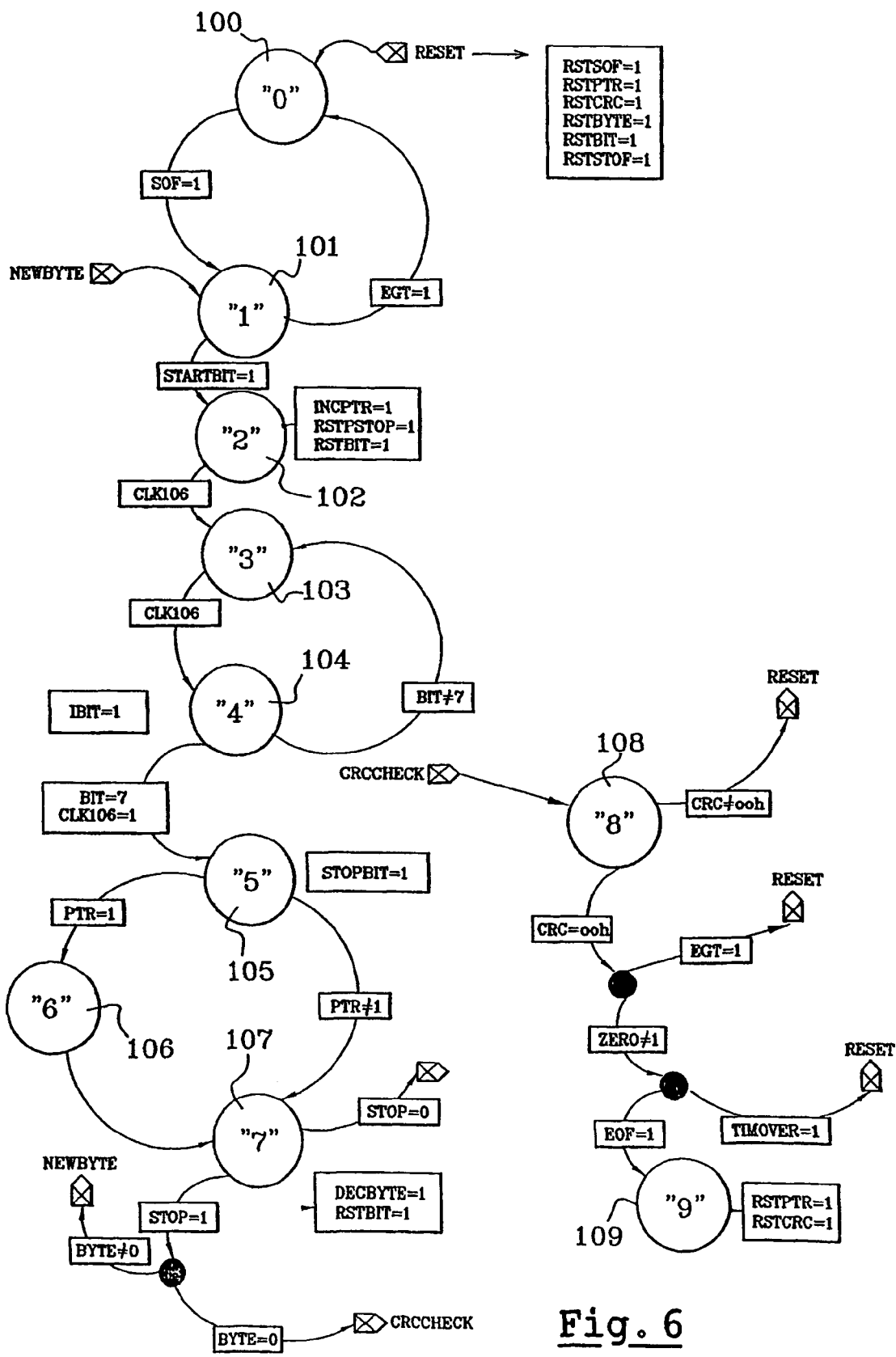
FIG. 6 is a state diagram of the state machine to sequence byte frame detection and formatting operations.
Figure 7A:
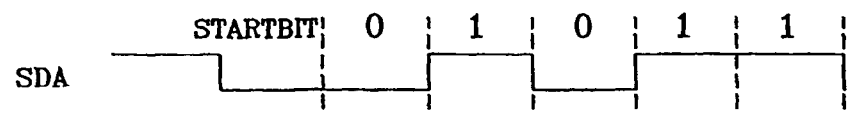
FIGS. 7a to 7h are diagrams of signals showing the detection of bits in a byte.
Figure 7B:
Figure 7C:
Figure 7D:
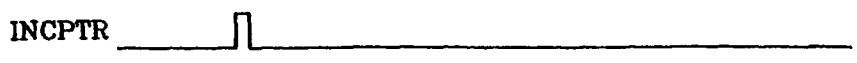
Figure 7E:
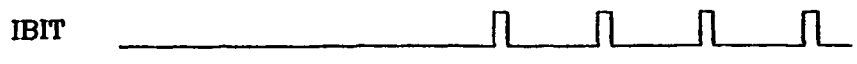
Figure 7F:
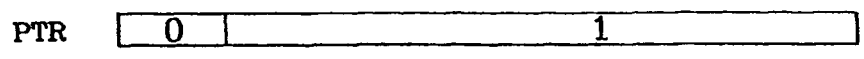
Figure 7G:
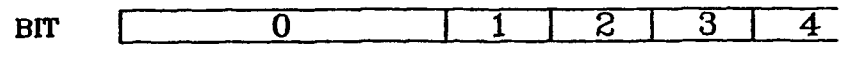
Figure 7H:
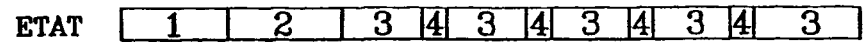

The diagram in FIG. 6 shows how the changeover is made from one state of the state machine 60 to another.

The first operation to be carried out is to detect the start of frame, i.e. SOF=1, which changes the state machine from STATE-0 (circle 100) to STATE-1 (circle 101) where it remains in waiting for detection of a start of byte signalled by STARTBIT=1.

If the start of byte bit is not detected after a certain time defined by the standard, the EGT=1 signal (EGT is the abbreviation for "Extra Guard Time") changes the state machine from STATE-1 to STATE-0 where it remains in waiting for the SOF=1 signal output by the circuit 62.

In this STATE-1, the ZERO signal (FIG. 4-b) is equal to the logical value "0" and the state machine remains in waiting for the start of byte bit corresponding to SDA=0 (FIG. 4-a).

If the start of byte bit is detected by circuit 64, the STARTBIT signal changes to the value 1 while the ZERO signal changes to the logical value "1" and remains in this state. The state machine changes to STATE-2 (circle 102) on the next pulse of clock CLK106. In this STATE-2, the INCPTR, RSTSTOP and RSTBIT signals change to logical level "1". The INCPTR=1 signal increments the counter 70, which selects the register 80 to be loaded. For example, if PTR=1, the register 80, will be selected.

The RSTBIT=1 signal initialises the bit counter 68 while the RSTSTOP signal initialises the circuit 76 to the "0" state. The next CLK106 pulse changes the state machine to STATE-3 (circle 103) where it remains in waiting for the useful data.

At the time of the next pulse CLK106, the data is validated and the state machine changes to STATE-4 (circle 104). The IBIT signal then changes to logical level "1" such that on the rising front of IBIT, the bit counter 68 is incremented by one unit such that the data is recorded in the register 80 pointed at by the value of the registers counter 70. The IBIT signal samples the serial data.

After seven rising fronts of the IBIT signal, in other words when bits counter 68 reaches the value 7, the first register pointed at by the signal PTR-1 is filled in such that the first byte is recorded in register 801.

The next pulse CLK106 changes the state machine to STATE-5 (circle 105). In this STATE-5, the value of the ninth bit corresponding to the stop bit is locked by the rising front of the STOPBIT signal. If STOP=0, it is considered that there is an error and the state machine returns to STATE-0 and reinitialises all flip flops and all registers.

In general, the number of bytes contained in the frame is indicated in the first eight, sixteen or twenty-four bits of the frame. In the first case, this corresponds to PTR-1 (register 801), in the second case to PTR-2 (register 802) and in the third case to PTR-3 (register 803).

The value of the first eight, sixteen and twenty-four bits is transformed by the circuit 78 into a number of bytes contained in the frame including the two CRC bytes, in other words the DATA code on the parallel output terminals of circuit 78. This DATA code is recorded in the bytes countdown 72.

In the example described, the value of the first eight bits is sufficient. Thus if PTR=1, the state machine changes to STATE-6 (circle 106) such that the LOABYTE=1 signal changes the DATA value (number of bytes in the frame) in the countdown 72. If PTR is not equal to the value "1", the DATA code is not loaded in the countdown 72.

The state machine changes to STATE-7 on the next CLK106 pulse. In this STATE-7, the countdown 72 is decremented by one unit by the DECBYTE=1 signal and the bits counter 68 is reset to zero by the RSTBIT=1 signal.

The STOP value is checked; if STOP=1, this means that the first byte was correctly received; if STOP=0, this means that there was an error and an error signal may or may not be generated depending on the application. If the BYTE signal is not equal to "0", the state machine returns to STATE-1 waiting for a new STARTBIT and the next byte, which corresponds to the NEWBYTE signal.

Operations to extract bytes from the frame and record them in registers $80_1$ to $80_m$ continue until the BYTE=0 signal is obtained which means that all bytes in the frame have been received. When the BYTE signal is equal to 2 and then equal to 1, this means that the next two bytes are error detector code bytes: the CRCVALID signal changes to the "1" state.

While the received data are being sampled, the serial data are switched to the error detector 66 that checks that the frame has been correctly transmitted.

If BYTE=0, the state machine changes to STATE-8 and the result of the error detector 66 is checked. If the result is not equal to zero, there is an error and the state machine returns to STATE=0 waiting for a new data frame.

If the result is equal to zero, there is no transmission error and the state machine starts waiting for the end of frame, in other words until EOF=1 and EGT=1 are obtained.

If ZERO=1 and EOF=1, the state machine changes to STATE-9 which means that all data are in registers to be decoded and executed.

Transmission errors are detected by means of two CRC bytes at the end of the frame. During the transmission, the CRC or key is calculated in real time on transmitted bits, except for SOF, EOF, STARTBIT and STOPBIT, and is added at the end of the frame. This key corresponds to the rest of the binary division of the message by a generating polynomial.

The same operation is carried out on message bits in reception.

If the remainder of the division is equal to zero, it is assumed that the message has not been affected by a transmission error. Otherwise, there was a transmission error and the receiver ignores the received data and signals to the sender that it has detected an error.

The above description of the invention defines a process for detection and formatting of data frames for signals received by a contact free smart card, characterised in that it comprises the following steps:
(a) detect 62 start of frame SOF and end of frame EOF signals,
(b) detect 64, 76 STARTBIT start of byte signals and ENDBIT end of byte signals,
(c) count 68 bits received after each start of byte until a byte is obtained,
(d) count 70 received bytes to switch the bits in a byte to one of the registers 80,
(e) analyse 78 at least a first received byte to determine the number of bytes in the frame currently being received, and
(f) load a countdown 7 with the number of bytes in the frame and decrement it as bytes are received until the digit "0" is obtained which means that all bytes in the frame have been received.

If contact free cards using ISO standards 14443-3 and 15693-3 are used, the generator polynomial is indicated by standard ISO/IEC 13239-B and is special in that:
the initial state of the registers is "FFFF" in hexadecimal coding,
before being added to the frame, the calculated key is inverted,
the remainder of the division of the message and key set is equal to F0B8 in hexadecimal coding.

Thus, to ignore this special feature, the invention proposes to invert the CRC bytes when they are detected on reception, which is possible due to the fact that the invention identifies bytes in advance in real time, including CRC bytes.

Figure 8:
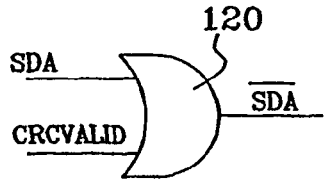
FIG. 8 is a diagram of a logic circuit to obtain the complement of the SDA signal.

This is achieved by applying the SDA signal to one of the two input terminals in an EXCLUSIVE OR circuit 120 (FIG. 8), the other input terminal receiving the CRCVALID signal that indicates reception of CRC bytes. The complementary SDA signal at the output from the EXCLUSIVE OR circuit 120 is applied to the error detector 66 instead of the SDA signal. This thus simplifies the comparison in the error detector.

When contact free smart cards receive a frame corresponding to a command including a selection request, the cards present in the reader field decode them and compare the received identifier with their serial number, for example contained in the memory 16 (FIG. 1). When the comparison checks out, the card is selected and goes into the active state and is ready to receive other commands.

It is known that this comparison can be made in parallel between two registers, one containing the serial number read in the memory 16 and the other containing the received identifier. This leads to having two registers and an EXCLUSIVE OR circuit on each digit to be compared, in other words using many circuits.

According to the invention, it is proposed that this comparison should be carried out in series by reading the memory 16, bit after bit, and comparing each bit with the corresponding bit in the received identifier. Consequently, the invention proposes the serial comparator according to the diagram in FIG. 9.

Figure 9:
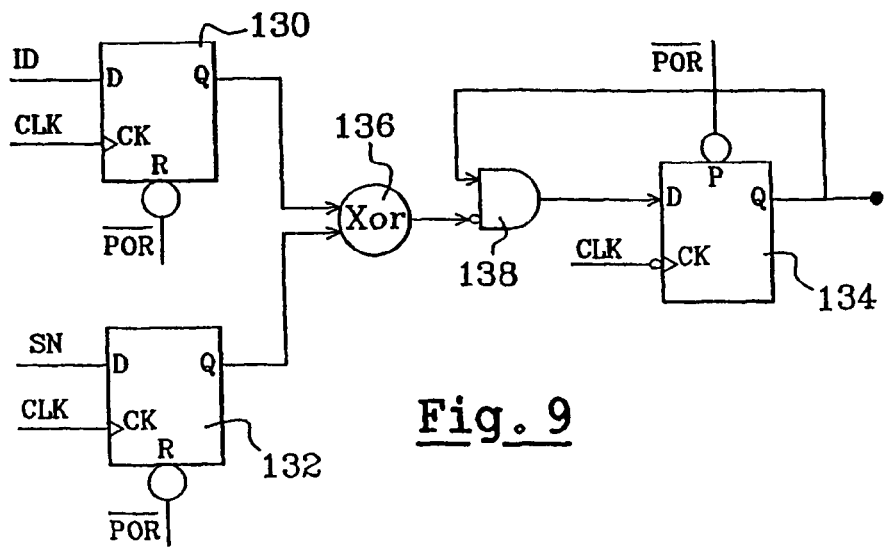
FIG. 9 is a diagram of a serial type comparison circuit.

The comparator comprises three type D flip flops 130, 132 and 134, an EXCLUSIVE OR circuit 136 and an AND circuit 138 (FIG. 9).

The input terminal D of the flip flop 130 receives digits of the identifier ID immediately as they are received, while the input terminal D of flip flop 132 receives the digits of the serial number SN read in series in memory 16. A clock signal CLK is applied to the clock input terminals CK of the two flip flops, corresponding to the signal used for reading the memory 16.

The reset input terminal R receives the $\overline{POR}$ signal since it is inverted. The output terminal Q of each flip flop 130 or 132 is connected to an input terminal of the EXCLUSIVE OR circuit 136 for which the output terminal is connected to an inverted input terminal of the AND circuit 138. The other input terminal of the AND circuit 138 is connected to the output terminal Q of the flip flop 134, for which the input terminal D is connected to the output terminal of the AND circuit 138.

The flip-flop 134 is put into the 1 state by the $\overline{POR}$ signal applied to the inverted input terminal P.

The clock input terminal CK of flip flop 134 is such that the state change takes place on the falling front of the clock signal CLK, and not on the rising front as for flip flops 130 and 132.

The serial comparator in FIG. 9 operates such that the output terminal Q of the flip flop 134 outputs a "0" state signal when the compared figures are the same, and a "1" state signal when the compared figures are different.

What is claimed is:

1. A data frame detection and formatting circuit in a contactless integrated circuit card, comprising:
    a state machine;
    a plurality of circuits that supply control signals to the state machine, wherein the plurality of circuits detect binary digits for a frame and arrange the binary digits in the form of bytes;
    a decoding circuit for determining a quantity of bytes in the frame and to provide the quantity of bytes in the frame to at least one of the plurality of circuits; and
    a plurality of registers, wherein one or more of the registers stores at least one byte in the frame as directed by the plurality of circuits;
    wherein the quantity of bytes in the frame is variable and wherein the decoder decodes at least a first byte in the frame to determine the quantity of bytes in the frame.

2. The data frame detection and formatting circuit of claim 1, wherein the state machine changes state as a function of the control signals received from the plurality of circuits and the state machine provides one or more output signals that are applied to the plurality of circuits.

3. The data frame detection and formatting circuit of claim 1, wherein the plurality of circuits include a byte countdown circuit, which is loaded with the number of bytes in the frame.

4. The data frame detection and formatting circuit of claim 3, wherein the plurality of circuits includes:
    a start of frame detector for detecting a start of a frame;
    an end of frame detector for detecting an end of a frame;
    a start of byte detector for detecting a start of a byte boundary;
    an end of byte detector for detecting an end of the byte boundary;
    a bit counter to count the number of binary digits received between the start of the byte boundary and the end of the byte boundary.

5. The data frame detection and formatting circuit of claim 4, wherein the plurality of circuits include:
    a register counter which is incremented by one unit every time that a byte is detected so as to address one of a plurality of registers in which the next byte will be stored.

6. The data frame detection and formatting circuit of claim 5, wherein the error detector circuit includes an Exclusive OR circuit applied to the error detector circuit in order to obtain a zero remainder for a division of binary digits in the frame by a generating polynomial.

7. The data frame detection and formatting circuit of claim 5, wherein the plurality of circuits include:
    an error detector circuit that checks the binary digits in the bytes as they are received in series.

8. The data frame detection and formatting circuit of claim 1, wherein the plurality of circuits include a byte countdown circuit, which is loaded with the number of bytes in the frame.

9. The data frame detection and formatting circuit of claim 8, wherein the plurality of circuits include:
    a register counter which is incremented by one unit every time that a byte is detected so as to address one of a plurality of registers in which the next byte will be stored.

10. The data frame detection and formatting circuit of claim 8, wherein the plurality of circuits includes:
    a start-of-frame detector for detecting a start of a frame;
    an end of frame detector for detecting an end of a frame;
    a start of byte detector for detecting a start of a byte boundary;
    an end of byte detector for detecting an end of the byte boundary;
    a bit counter to count the number of binary digits received between the start of the byte boundary and the end of the byte boundary.

11. The data frame detection and formatting circuit of claim 10, wherein the plurality of circuits include:
    an error detector circuit that checks the binary digits in the bytes as they are received in series.

12. The data frame detection and formatting circuit of claim 11, wherein the error detector includes an Exclusive OR circuit applied to the error detector circuit in order to obtain a zero reminder for a division of binary digits in the frame by a generating polynomial.

13. The data frame detection and formatting circuit of claim 1, further comprising:
- a serial comparator for comparing binary digits forming a selection identifier and binary digits forming a serial number of the integrated circuit card, the serial comparator comprising:
  - a first flip flop, including a first input terminal for receiving the binary digits of the selection identifier and a second input terminal for receiving a clock pulse so that a state of the first flip flop is changed on a rising front of the clock pulse;
  - a second flip flop, including a first input terminal for receiving binary digits of the serial number of the integrated circuit cards, and a second input terminal for receiving the clock pulse so that the state of the second flip flop Is changed on the rising front of the clock pulse;
  - an Exclusive OR circuit, including a first input terminal connected to an output terminal of the first flip flop, and a second input terminal connected to an output terminal of the second flip flop;
  - a third flip flop with a first input, a second input and an output;
  - an "AND" circuit, including a first input terminal is connected to an output terminal of the Exclusive OR circuit, and the output terminal of which is connected to the first input terminal of the third flip flop;
  - wherein the output terminal of the third flip flop is connected to a second input terminal of the "AND" circuit so that the state of the third flip flop is changed on a falling front of a clock pulse applied to the second input terminal of the third flip flop.

14. A data frame detection and formatting circuit in a contactless integrated circuit card, comprising:
- a state machine;
- a plurality of circuits that supply control signals to the state machine, wherein the plurality of circuits detect binary digits for a frame and arrange the binary digits in the form of bytes;
- a decoding circuit to decode a number of bytes in the frame and to provide the number of bytes in the frame to at least one of the plurality of circuits; and
- a plurality of registers, wherein one or more of the registers stores at least one byte in the frame as directed by the plurality of circuits;
- a serial comparator for comparing binary digits forming a selection identifier and binary digits forming a serial number of the Integrated circuit card, the serial comparator comprising:
  - a first flip flop, including a first input terminal for receiving the binary digits of the selection identifier and a second input terminal for receiving a clock pulse so that a state of the first flip flop is changed on a rising front of the clock pulse;
  - a second flip flop, including a first input terminal for receiving binary digits of the serial number of the integrated circuit cards, and a second input terminal for receiving the clock pulse so that the state of the second flip flop is changed on the rising front of the clock pulse;
  - an Exclusive OR circuit, including a first input terminal connected to an output terminal of the first flip flop, and a second input terminal connected to an output terminal of the second flip flop;
  - a third flip flop with a first input, a second input and an output;
  - an "AND" circuit, including a first input terminal is connected to an output terminal of the Exclusive OR circuit, and the output terminal of which is connected to the first input terminal of the third flip flop;
  - wherein the output terminal of the third flip flop is connected to a second input terminal of the "AND" circuit so that the state of the third flip flop is changed on a falling front of a clock pulse applied to the second input terminal of the third flip flop.

15. A process for detection and formatting of data frames for a signal received by a contactless integrated circuit card, comprising:
- receiving a series of binary digits;
- detecting a start of frame and an end of frame in the series of bits;
- detecting a start of byte boundary and an end of byte boundary in the series of bits;
- counting binary digits received after each start byte boundary until a byte is obtained;
- storing each byte received in a register;
- analyzing at least a first byte to determine the number of bytes in the frame; and
- loading a countdown register with the number of bytes in the frame;
- wherein the number of bytes in the frame is variable.

* * * * *

UNITED STATES PATENT AND TRADEMARK OFFICE
CERTIFICATE OF CORRECTION

PATENT NO. : 7,003,407 B1  
DATED : February 21, 2006  
INVENTOR(S) : Ahmed Kari et al.

It is certified that error appears in the above-identified patent and that said Letters Patent is hereby corrected as shown below:

Column 9,  
Line 1, change "reminder" to -- remainder --.

Signed and Sealed this

Sixth Day of June, 2006

JON W. DUDAS  
*Director of the United States Patent and Trademark Office*